United States Patent
Mai et al.

(10) Patent No.: US 11,815,767 B2
(45) Date of Patent: Nov. 14, 2023

(54) DISPLAY PANEL AND LIQUID CRYSTAL DISPLAY

(71) Applicant: Century Technology (Shenzhen) Corporation Limited, Shenzhen (CN)

(72) Inventors: Chen-Fu Mai, New Taipei (TW); Meng-Chieh Tai, New Taipei (TW); Yu Zhang, Shenzhen (CN); Min Hu, Shenzhen (CN); Lan-Qing Xiao, Shenzhen (CN)

(73) Assignee: Century Technology (Shenzhen) Corporation Limited, Shenzhen (CN)

( * ) Notice: Subject to any disclaimer, the term of this patent is extended or adjusted under 35 U.S.C. 154(b) by 0 days.

(21) Appl. No.: 17/582,489

(22) Filed: Jan. 24, 2022

(65) Prior Publication Data

US 2023/0070153 A1   Mar. 9, 2023

(30) Foreign Application Priority Data

Sep. 3, 2021  (CN) .......................... 202111032746.7

(51) Int. Cl.
*G02F 1/1339* (2006.01)
*G02F 1/1335* (2006.01)
*G02F 1/1368* (2006.01)

(52) U.S. Cl.
CPC ........ *G02F 1/13394* (2013.01); *G02F 1/1368* (2013.01); *G02F 1/133512* (2013.01); *G02F 1/133514* (2013.01)

(58) Field of Classification Search
CPC . G02F 1/1339; G02F 1/13394; G02F 1/13396
See application file for complete search history.

(56) References Cited

U.S. PATENT DOCUMENTS

| | | | |
|---|---|---|---|
| 2010/0110022 A1* | 5/2010 | Chen ..................... | G06F 3/0412 345/173 |
| 2016/0231609 A1* | 8/2016 | Doi ...................... | G02F 1/13394 |
| 2018/0088405 A1* | 3/2018 | Nagasawa .......... | G02F 1/133512 |
| 2019/0302506 A1* | 10/2019 | Nishimura ............ | G02F 1/1368 |
| 2020/0341318 A1* | 10/2020 | Kurozumi ......... | G02F 1/136286 |

FOREIGN PATENT DOCUMENTS

TW           200823575 A      6/2008

* cited by examiner

*Primary Examiner* — Angela K Davison
(74) *Attorney, Agent, or Firm* — ScienBiziP, P.C.

(57) ABSTRACT

A display panel includes a color filter (CF) substrate including first support structures, a thin film transistor (TFT) substrate including second support structures, and a liquid crystal layer. Each of the first support structures resists against the TFT substrate, and each of the second support structures resists against the CF substrate to form a receiving space between the CF substrate and the TFT substrate, the receiving space contains the liquid crystal layer. The TFT substrate applies driving signals to the liquid crystal layer to modulate backlight received by the liquid crystal layer from a backlight source. The CF substrate allows light to be emitted as images by filtering the modulated backlight.

18 Claims, 6 Drawing Sheets

100

DISPLAY PANEL AND LIQUID CRYSTAL DISPLAY

FIELD

The present disclosure generally relates to display technology, particularly relates to a display panel and a liquid crystal display.

BACKGROUND

The traditional light alignment technology applied in a liquid crystal display (LCD) is a rubbing process. The LCD includes a liquid crystal layer and an alignment film. In the rubbing process, a surface of the alignment film is brushed by a rubbing cloth, which can form a channel along a brushing direction on the alignment film and arrange a direction for the liquid crystal molecules in the liquid crystal layer with a certain pretilt angle.

The LCD also includes a color filter (CF) substrate and a thin film transistor (TFT) substrate. The CF substrate includes a plurality of support columns covered by the alignment film. Each support column has a certain height, which segments the surface of the alignment film into different levels of height, the difference can be of several microns (that is, not flat). When the rubbing cloth passes through the support columns, weak alignment areas will be formed where the support columns are located, which results in abnormal alignment of the liquid crystal molecules and consequential problems of light leakage, contrast reduction, and uneven brightness of the LCD.

DETAILED DESCRIPTION

First Embodiment

Figure 1:
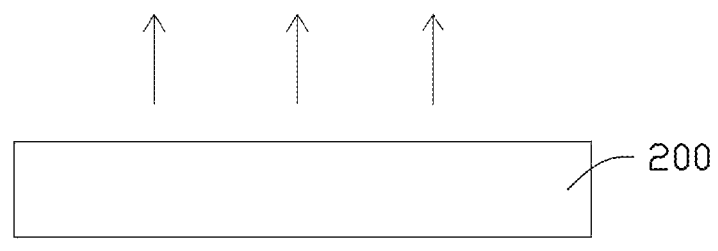
FIG. 1 shows an LCD in a first embodiment of the present disclosure.
Figure 1:
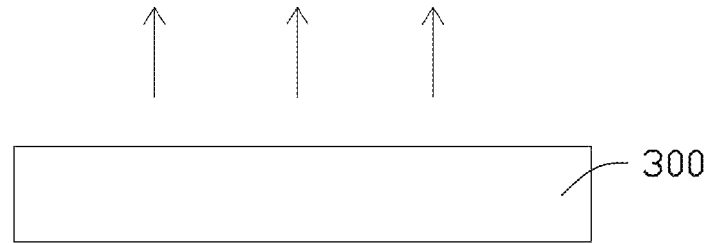

As shown in FIG. 1, in this embodiment, an LCD 100 includes a display panel 200 and a backlight module 300 underneath the display panel 200. The backlight module 300 is used to emit backlight, the backlight is white light. In other embodiment, the backlight may be monochromatic light. The display panel 200 is on an optical path of the backlight and modulates the backlight to generate images. The light for images is emitted from a side of the display panel 200 away from the backlight module 300 for displaying images.

Figure 2:
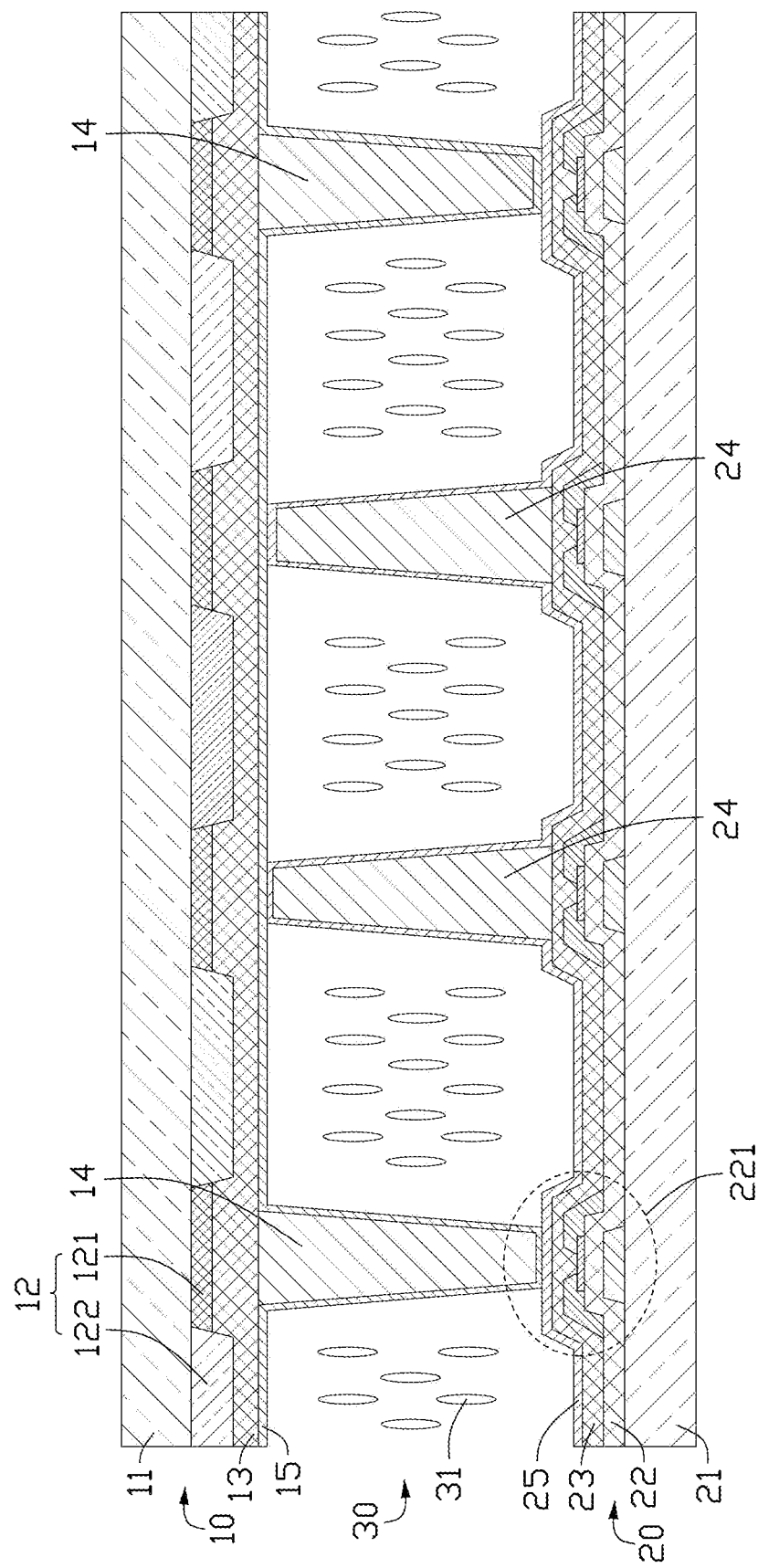
FIG. 2 is a cross-sectional view of a display panel in FIG. 1.

As shown in FIG. 2, the display panel 200 includes a CF substrate 10, a TFT substrate 20, and a liquid crystal layer 30 between the CF substrate 10 and the TFT substrate 20.

The TFT substrate 20 applies driving signals to the liquid crystal layer 30 to control rotation of liquid crystal molecules 31 in the liquid crystal layer 30. Rotation angles of the liquid crystal molecules 31 change with the driving signals. Light transmittance of the liquid crystal layer 30 changes with the rotation angles of the liquid crystal molecules 31. The display panel 200 receives the backlight and controls the rotation angles of the liquid crystal molecules 31 according to the driving signals, to control the light transmittance through the liquid crystal layer 30. The driving signals are generated according to image data. These processes cause the display panel 200 to modulate the backlight into images according to the image data.

The backlight transmitted from the liquid crystal layer 30 is incident on the CF substrate 10. The CF substrate 10 selects the backlight according to a certain wavelength, transmits the backlight of the certain wavelength in a certain area, and emits light in the form of images.

Figure 3:
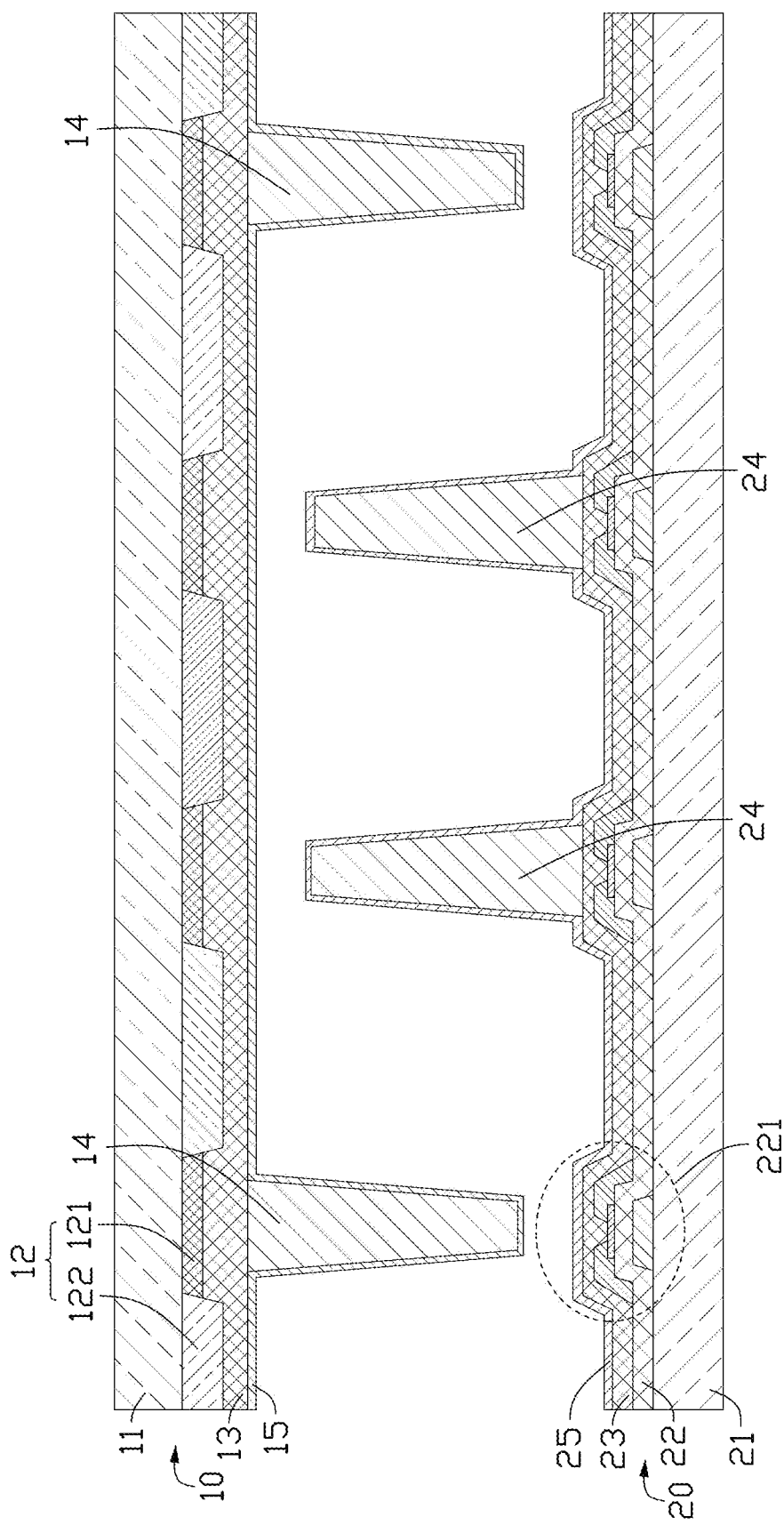
FIG. 3 is a cross-sectional view of a CF substrate and a TFT substrate in the display panel of FIG. 2.

As shown in FIG. 3, the CF substrate 10 includes a first glass substrate 11, a filter layer 12, a first insulating layer 13, a plurality of first support structures 14, and a first alignment film 15 stacked in the order written. The first support structures 14 are on a surface of the first insulating layer 13 away from the first glass substrate 11. The first alignment film 15 covers the first insulating layer 13 and the first support structures 14.

The TFT substrate 20 includes a second glass substrate 21, a driving layer 22, a second insulating layer 23, a plurality of second support structures 24, and a second alignment film 25 stacked in the order written. The second support structures 24 are on a surface of the second insulating layer 23 away from the second glass substrate 21. The second alignment film 25 covers the second insulating layer 23 and the second support structures 24. In this embodiment, the driving layer 22 includes a plurality of thin film transistors (TFTs) 221. Each TFT 221 applies one driving signal to the liquid crystal layer 30.

The CF substrate 10 and the TFT substrate 20 are assembled together after separate manufacture, a top end of each first support structure 14 away from the first glass substrate 11 resists against the TFT substrate 20 through the first alignment film 15. That is, the top end of each first support structure 14 is not in direct contact with the TFT substrate 20. A top end of each second support structure 24 away from the second glass substrate 21 resists against the CF substrate 10 through the second alignment film 25. That is, the top end of each second support structure 24 is not in direct contact with the CF substrate 10. A certain distance is maintained by the first support structures 14 and the second support structures 24 between the CF substrate 10 and the TFT substrate 20 after assembly of the CF substrate 10 and the TFT substrate 20, and a receiving space is formed between the CF substrate 10 and the TFT substrate 20. The structure shown in FIG. 2 is formed by applying the liquid crystal molecules 31 into the receiving space.

When a pressure is applied to the display panel 200, the first support structures 14 and the second support structures 24 still maintain the necessary distance between the CF substrate 10 and the TFT substrate 20. That is, the receiving space for receiving the liquid crystal layer 30 is always between the CF substrate 10 and the TFT substrate 20. Each first support structure 14 and each second support structure 24 have a certain elasticity. When the display panel 200 is pressured, the first support structures 14 and the second support structures 24 are compressed, and the distance between the CF substrate 10 and the TFT substrate 20 is reduced. When the pressure is removed, the first support structures 14 and the second support structures 24 return to their original heights (length along a thickness direction of the display panel 200), so that the distance between the CF substrate 10 and the TFT substrate 20 is regained.

Figure 4:
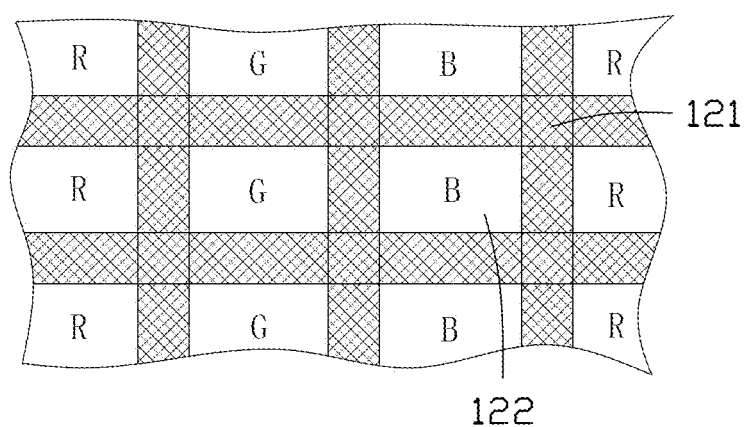
FIG. 4 is a planar view of a filter layer in the display panel of FIG. 2.

As shown in FIG. 4, the filter layer 12 includes a black matrix 121 and a plurality of filters 122. The black matrix 121 is opaque and has a grid shape. The black matrix 121 defines a plurality of filter areas arranged in a plurality of rows extending in a horizontal direction. Each filter 122 is in a filter area. That is, the filters 122 are arranged in rows extending in the horizontal direction. In this embodiment, each row includes the same number of filters. The filters 122 includes three types of filters, that are filters R for transmitting red light, filters G for transmitting green light, and filters B for transmitting blue light. In each row, filters R, G, and B are arranged alternately.

As shown in FIG. 3 and FIG. 4, in this embodiment, projections of each first support structure 14 and each second support structure 24 on the filter layer 12 are on the black matrix 121. That is, each first support structure 14 is disposed on the first insulating layer 13 where the black matrix 121 is located, and each second support structure 24 extends toward the black matrix 121. In this embodiment, the first support structures 14 and projections of the second support structures 24 are on the black matrix 121 of the filter layer 12 between two rows of the filters 122.

In this embodiment, after forming the structure shown in FIG. 2, each liquid crystal molecule 31 in the liquid crystal layer 30 needs to have a pretilt angle. The first alignment film 15 and the second alignment film 25 are used to control the pretilt angle of each liquid crystal molecule 31. The first alignment film 15 and the second alignment film 25 need to be optically aligned. The first support structures 14 and the second support structures 24 mean that surfaces of the first alignment film 15 and the second alignment film 25 close to the liquid crystal layer 30 are not flat (positions on the surface of the first alignment film 15 formed on the first support structures 14 are raised towards the liquid crystal layer 30, and positions on the surface of the second alignment film 25 formed on the second support structures 24 are raised towards the liquid crystal layer 30). That is, there is a height difference to the surface of the first alignment film 15, and there is a height difference to the surface of the second alignment film 25. These height differences may cause an alignment abnormality of the first alignment film 15 and the second alignment film 25. Since the filters G have a highest transmittance, the first support structures 14 close to the filters G are more likely to cause the alignment abnormality.

Therefore, in this embodiment, the first support structures 14 on the CF substrate 10 are away from the filters G That is, after the CF substrate 10 is aligned with the TFT substrate 20, the second support structures 24 on the TFT substrate 20 are closer to the filters G than the first support structures 14 on the CF substrate 10.

In the display panel 200 of this embodiment, since support structures (that is, the second support structures 24) close to the filters G are formed on the TFT substrate 20, alignment on the position of the first alignment film 15 corresponding to the filters G is easily achieved when aligning the first alignment film 15 on the CF substrate 10. Therefore, the display panel 200 of this embodiment reduces an influence on the optical alignment to a certain extent, which can reduce a light leakage of the LCD 100 and improve a display efficiency and a brightness uniformity of the LCD 100.

Second Embodiment

Figure 5:
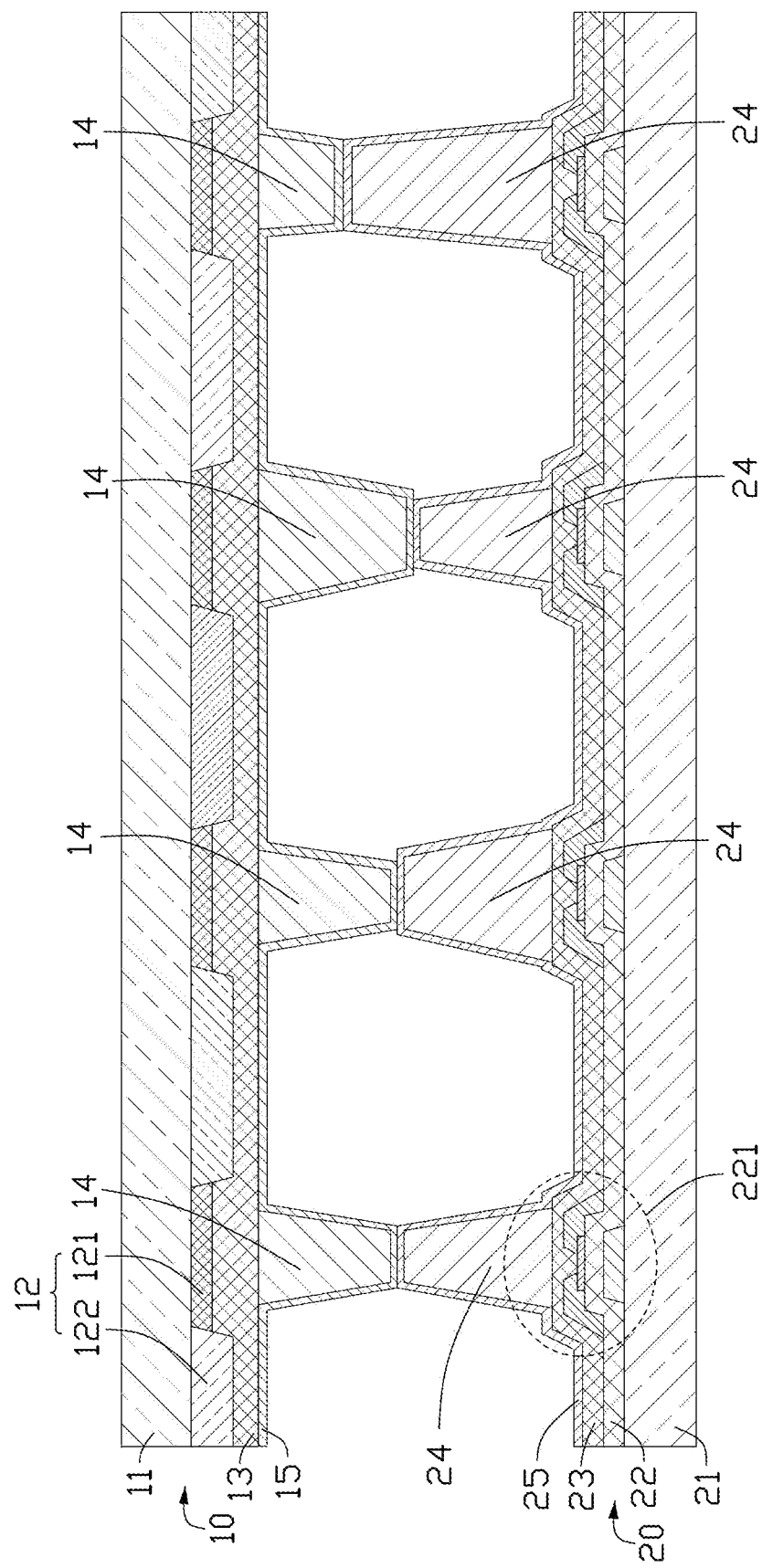
FIG. 5 is a cross-sectional view of a display panel in a second embodiment of the present disclosure.

As shown in FIG. 5, a main difference between this embodiment and the first embodiment is that in the display panel 200 of this embodiment, the first support structures 14 and the second support structures 24 are equal in number, and the first support structures 14 and the second support structures 24 are corresponding one-to-one.

In this embodiment, the top ends of one first support structure 14 and one second support structure 24 resist against each other through the first alignment film 15 and the second alignment film 25, respectively. The top ends are flat surfaces. Each first support structure 14 and each second support structure 24 jointly maintain the spacing between the CF substrate 10 and the TFT substrate 20.

A structural relationship of one first support structure 14 and one second support structures 24 corresponding to each other may as shown in FIG. 5.

Structure 1: the first support structure 14 and the second support structure 24 corresponding to each other have the same shape and structure and are arranged symmetrically around the center.

Structure 2: the first support structure 14 and the second support structure 24 corresponding to each other have a same height (length along a direction of a thickness of the display panel 200), but have different top-end sizes (the area of the top end of the first support structure 14 is larger than that of the top end of the second support structure 24, or the area of the top end of the first support structure 14 is smaller than that of the top end of the second support structure 24). These different sizes improve a butting area and a structural stability of the display panel 200. Moreover, when the display panel 200 is under a pressure, the first support structure 14 and second support structure 24 corresponding to each other are not easily misaligned and remain stable, which further improves the structural stability of the display panel 200.

Structure 3: the top ends of the first support structure 14 and the second support structure 24 corresponding to each other have the same size but different heights. Support structures with different heights have different elasticities, which causes different directions of stress when the display panel 200 is under pressure. Adjusting the heights of the first support structure 14 and the second support structure 24 also adjusts the stress direction when the display panel 200 is being stressed.

One display panel 200 may include one or more of the above-described three structures.

In the display panel 200 of this embodiment, the first support structures 14 and the second support structures 24 mutually resist against one-to-one, the space between the CF substrate 10 and the TFT substrate 20 is maintained by each pair of the first support structure 14 and the second support structure 24, which can reduce the heights of the first support structures 14 and the second support structures 24, reduce the height difference of the surfaces of the first alignment film 15 and the second alignment film 25, avoid alignment abnormalities of the first alignment film 15 and the second alignment film 25, reduce the light leakage of the LCD 100, and improve the contrast and the brightness uniformity of the LCD 100.

Third Embodiment 3

Figure 6:
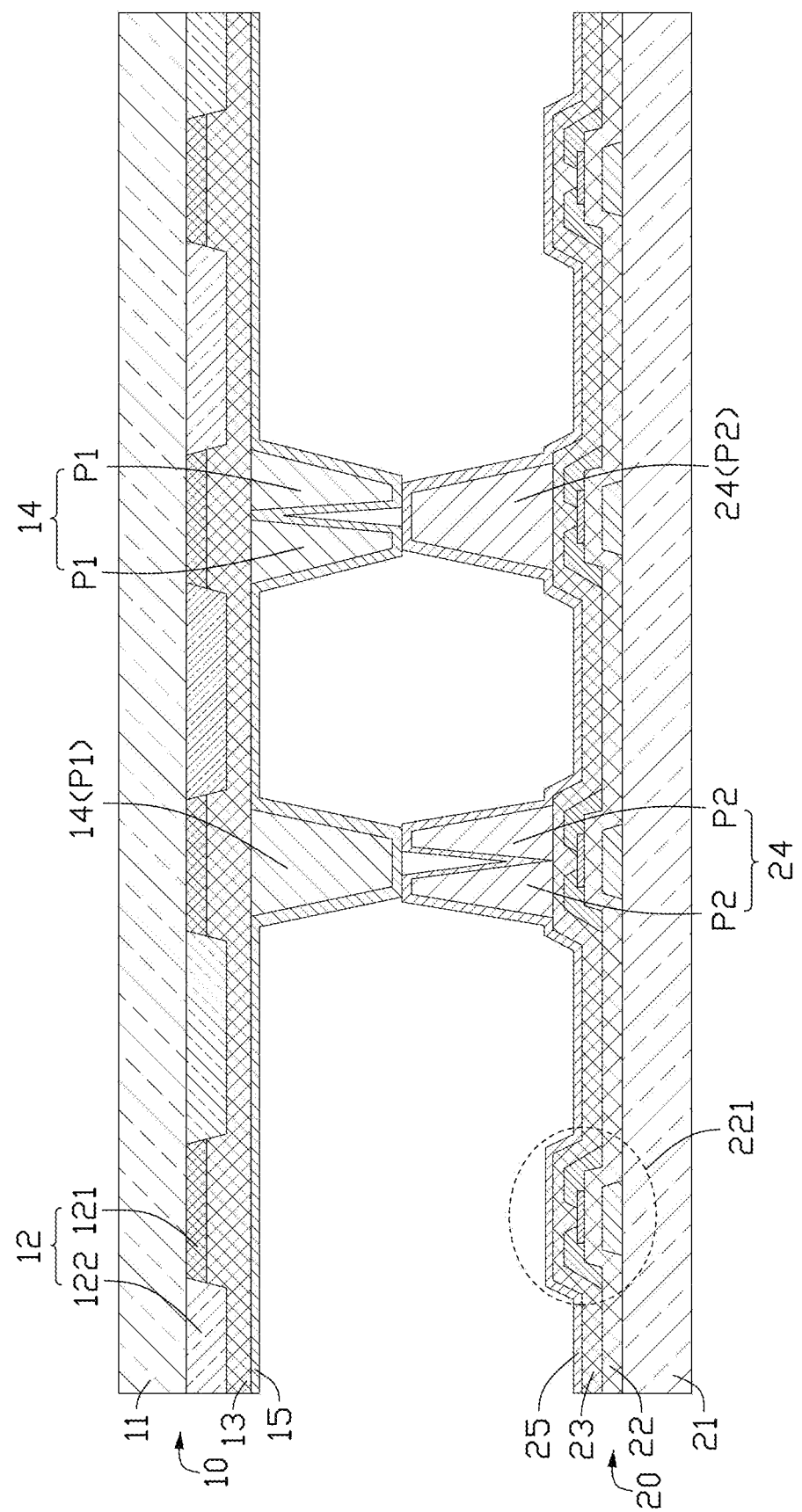
FIG. 6 is a cross-sectional view of a display panel in a third embodiment of the present disclosure.

As shown in FIG. 6, a main difference between this embodiment and the second embodiment is that in this embodiment, one of the first support structure 14 and the second support structure 24 includes one support column, the other opposing one includes at least two support columns.

For example, as shown in FIG. 6, the first support structure 14 includes one support column P1 and the second support structure 24 includes two support columns P2, or the first support structure 14 includes two support columns P1 and the second support structure 24 includes one support column P2.

The first support structure 14 includes one support column P1 and the second support structure 24 includes two support columns P2 as an example, an end of the support column P1 away from the first glass substrate 11 and ends of the two support columns P2 away from the second glass substrate 21 mutually resist against the first alignment film 15 and the second alignment film 25. The ends of the two support columns P2 away from the second glass substrate 21 are spaced apart from each other. The support column P1 resists against both support columns P2.

This embodiment can realize all the beneficial effects described in embodiment 2. On this basis, this embodiment can also adjust an elasticity direction and an elastic size of the display panel 200 when under pressure by adjusting the number of the support columns in each first support structure 14 and in each second support structure 24.

The first support structures 14 in each embodiment are formed by exposure and development process. The CF substrate 10 includes other structures (for example, the black matrix 121, the filters 122, and the first insulating layer 13) that are also formed by exposure and development process. Therefore, the first support structures 14, the black matrix 121, the filters 122, and the first insulating layer 13 are made of a same material, the first support structures 14, the black matrix 121, the filters 122, and the first insulating layer 13 can be formed in a same process, which can reduce manufacturing steps.

Similarly, the second support structures 24 on the TFT substrate 20 can also be formed in a same exposure development process with other structures in the TFT substrate 20, which can reduce manufacturing process of the display panel 200.

Ordinary technicians in the technical field should realize that the above embodiments are only used to illustrate the present disclosure and not to limit the present disclosure. Appropriate changes made to the above embodiments fall within a protection scope of the present disclosure as long as the changes are within a substantive spirit of the present disclosure.

What is claimed is:

1. A display panel comprising:
a color filter (CF) substrate comprising a plurality of first support structures;
a thin film transistor (TFT) substrate comprising a plurality of second support structures, each of the plurality of first support structures supporting the TFT substrate, and each of the plurality of second support structures supporting the CF substrate, a receiving space is defined between the CF substrate and the TFT substrate; and
a liquid crystal layer in the receiving space, the TFT substrate being configured to apply a plurality of driving signals to the liquid crystal layer to modulate backlight received by the liquid crystal layer, and the CF substrate being configured to generate image light for displaying images by filtering the modulated backlight;
wherein the CF substrate further comprises a filter layer comprising a black matrix and a plurality of filters, the black matrix is in a grid shape and defines a plurality of filter areas, each of the plurality of filters is in a corresponding one of the plurality of filter areas; the plurality of filters comprises filters that transmit green light and along a direction perpendicular to a thickness direction of the display panel, the plurality of second support structures is closer to the filters that transmit green light than the plurality of first support structures.

2. The display panel of claim 1, wherein each of the plurality of first support structures is paired with and supports one of the plurality of second support structures.

3. The display panel of claim 2, wherein in each pair of the first support structure and the second support structure supporting each other, the first support structure and the second support structure have a same length along the thickness direction of the display panel, and an end of the first support structure and an end of the second support structure supporting each other have a same area.

4. The display panel of claim 2, wherein in each pair of the first support structure and the second support structure supporting each other, the first support structure and the second support structure have a same length along the thickness direction of the display panel, and an end of the first support structure and an end of the second support structure supporting each other have different areas.

5. The display panel of claim 2, wherein in each pair of the first support structure and the second support structure supporting each other, the first support structure and the second support structure have different lengths along the thickness direction of the display panel, and an end of the first support structure and an end of the second support structure supporting each other have a same area.

6. The display panel of claim 2, wherein in each pair of the first support structure and the second support structure supporting each other, the first support structure comprises one support column, and the second support structure comprises at least two support columns.

7. The display panel of claim 6, wherein the one support column supports the at least two support columns.

8. The display panel of claim 2, wherein in each pair of the first support structure and the second support structure supporting each other, the first support structure comprises at least two support columns, and the second support structure comprises one support column.

9. The display panel of claim 8, wherein the one support column supports the at least two support columns.

10. A liquid crystal display comprising:
a backlight module for emitting backlight; and
a display panel on an optical path of the backlight, the display panel comprising:
a color filter (CF) substrate comprising a plurality of first support structures;
a thin film transistor (TFT) substrate comprising a plurality of second support structures, each of the plurality of first support structures supporting the TFT substrate, and each of the plurality of second support structures supporting the CF substrate, a receiving space is defined between the CF substrate and the TFT substrate; and
a liquid crystal layer in the receiving space a liquid crystal layer in the receiving space, the TFT substrate being configured to apply a plurality of driving signals to the liquid crystal layer to modulate backlight received by the liquid crystal layer, and the CF substrate being configured to generate image light for displaying images by filtering the modulated backlight;
wherein the CF substrate further comprises a filter layer comprising a black matrix and a plurality of filters, the black matrix is in a grid shape and defines a plurality of filter areas, each of the plurality of filters is in a corresponding one of the plurality of filter areas; the plurality of filters comprises filters that transmit green light and along a direction perpendicular to a thickness direction of the display panel, the plurality of second support structures is closer to the filters that transmit green light than the plurality of first support structures.

11. The liquid crystal display of claim 10, wherein each of the plurality of first support structures is paired with and supports one of the plurality of second support structures.

12. The liquid crystal display of claim 11, wherein in each pair of the first support structure and the second support structure supporting each other, the first support structure and second support structure have a same length along the thickness direction of the display panel, and an end of the first support structure and an end of the second support structure supporting each other have a same area.

13. The liquid crystal display of claim 11, wherein in each pair of the first support structure and the second support structure supporting each other, the first support structure and the second support structure have a same length along the thickness direction of the display panel, and an end of the first support structure and an end of the second support structure supporting each other have different areas.

14. The liquid crystal display of claim 11, wherein in each pair of the first support structure and the second support structure supporting each other, the first support structure and the second support structure have different lengths along the thickness direction of the display panel, and an end of the first support structure and an end of the second support structure supporting each other have a same area.

15. The liquid crystal display of claim 11, wherein in each pair of the first support structure and the second support structure supporting each other, the first support structure comprises one support column, and the second support structure comprises at least two support columns.

16. The liquid crystal display of claim 15, wherein the one support column supports the at least two support columns.

17. The liquid crystal display of claim 11, wherein in each pair of the first support structure and the second support structure supporting each other, the first support structure comprises at least two support columns, and the second support structure comprises one support column.

18. The liquid crystal display of claim 17, wherein the one support column supports the at least two support columns.

* * * * *